(12) United States Patent
Small et al.

(10) Patent No.: US 10,457,774 B2
(45) Date of Patent: Oct. 29, 2019

(54) POLYMERIC MATERIALS

(71) Applicant: Victrex Manufacturing Limited, Lancashire (GB)

(72) Inventors: Geoff Small, Lancashire (GB); Richard Ainsworth, Lancashire (GB)

(73) Assignee: Victrex Manufacturing Limited, Lancashire (GB)

( * ) Notice: Subject to any disclaimer, the term of this patent is extended or adjusted under 35 U.S.C. 154(b) by 8 days.

(21) Appl. No.: 15/555,848

(22) PCT Filed: Mar. 29, 2016

(86) PCT No.: PCT/GB2016/050870
§ 371 (c)(1),
(2) Date: Sep. 5, 2017

(87) PCT Pub. No.: WO2016/156825
PCT Pub. Date: Oct. 6, 2016

(65) Prior Publication Data
US 2018/0044470 A1    Feb. 15, 2018

(30) Foreign Application Priority Data

Mar. 27, 2015  (GB) .................................. 1505314.3

(51) Int. Cl.
*C08G 65/00* (2006.01)
*C08G 65/40* (2006.01)
*F17C 13/00* (2006.01)

(52) U.S. Cl.
CPC ......... *C08G 65/00* (2013.01); *C08G 65/4012* (2013.01); *F17C 13/00* (2013.01); *C08G 2650/40* (2013.01); *F17C 2203/0673* (2013.01); *F17C 2203/0675* (2013.01); *F17C 2221/033* (2013.01); *F17C 2223/0161* (2013.01)

(58) Field of Classification Search
CPC ....................................................... C08G 65/00
USPC ............................................................. 528/398
See application file for complete search history.

(56) References Cited

U.S. PATENT DOCUMENTS

| 2002/0094286 A1 | 7/2002 | Nguyen et al. |
| 2009/0131582 A1 | 5/2009 | Grant et al. |
| 2014/0128566 A1 | 5/2014 | Grant et al. |

FOREIGN PATENT DOCUMENTS

| GB | 2439207 | 12/2007 |
| GB | 2519657 | 4/2015 |
| WO | 2011112073 | 9/2011 |
| WO | 2012001131 | 1/2012 |
| WO | 2015001327 | 1/2015 |

OTHER PUBLICATIONS

International Search Report and Written Opinion for Application No. PCT/GB2016/050870 dated Jun. 13, 2016 (10 pages).
Search Report from United Kingdom Intellectual Property Office for Application No. GB1605221.9 dated Sep. 26, 2016 (4 pages).

*Primary Examiner* — Duc Truong
(74) *Attorney, Agent, or Firm* — Casimir Jones, S.C.; Anne Reynolds

(57) ABSTRACT

An assembly or apparatus for use in relation to an assembly, wherein said assembly is subjected to a temperature of less than $-50°$ C. in use, wherein said assembly or apparatus includes a component which comprises a polymeric material (A) having a repeat unit of formula —O-Ph-O-Ph-CO-Ph- (I) wherein Ph represents a phenylene moiety; and wherein said polymeric material (A) has a melt viscosity of at least 0.50 $kNsm^{-2}$.

14 Claims, 5 Drawing Sheets

POLYMERIC MATERIALS

This invention relates to polymeric materials and particularly, although not exclusively, relates to polymeric materials for use in low temperature, for example cryogenic applications, such as in liquefied natural gas (LNG) storage tanks or in the oil and gas industry in general. The invention also relates to polymeric materials for use in polar regions.

LNG is a mixture of hydrocarbons, predominantly methane, but with varying levels of ethane, propane, butane and other naturally occurring gases found in natural gas. LNG normally has a boiling temperature between −166° C. and −57° C. at atmospheric pressure.

According to EN/ISO 16903, many common materials of construction fail in a brittle manner when they are exposed to these very low temperatures and recommends that materials used in contact with LNG should be proven resistant to brittle fracture.

Various steel and non-ferrous alloys have been developed over the years to meet the challenges of property retention in such extremes of temperature.

As an alternative to metals, polymers may be used in low temperature applications. There are several basic requirements for polymers to function well at very low temperatures—processability; and appropriate mechanical properties at both room temperature and low temperature.

In the context of polymers, the main problem with use at very low temperatures is the very low mobility of polymer chains and hence low levels of ductility. This may manifest itself when a part made from a polymeric material (e.g. a valve seat) is subjected to an increasing load. When the incidental load reaches a critical level, a crack may propagate rapidly in the part, even at relatively low energy, leading to failure of the part. Additionally, any surface defects or damage caused during use or manufacture of a polymeric part will act as a stress concentrator which could also lead to rapid and brittle failure in parts having low levels of ductility at the temperature of use.

Commonly used polymers for low temperature applications include PTFE, PCTFE, FEP, polyethylene, polycarbonate, polyimides and various elastomers which have been specially formulated to retain ductility at very low temperatures. However, whilst such polymers may be suitable for some low temperature uses, for other uses, polymers are required which have improved mechanical, abrasion and erosion resistance properties, whilst having excellent chemical resistance properties.

Polyaryletherketones such as polyetheretherketone (PEEK) and polyetherketone (PEK) are well known high performance thermoplastic polymers which have excellent mechanical and chemical resistance properties, in general. However, it has been found by Applicant that some polyaryletherketones are less suited to very low temperature applications compared to others.

It is an object of the present invention to address the above-described problems.

It is an object of the present invention to provide a polymeric material which may be advantageously used in low temperature, for example, cryogenic applications.

According to a first aspect of the invention, there is provided an assembly or apparatus for use in relation to an assembly, wherein said assembly is subjected to a temperature of less than −50° C. in use, wherein said assembly or apparatus includes a component which comprises a polymeric material (A) having a repeat unit of formula —O-Ph-O-Ph-CO-Ph-     I wherein Ph represents a phenylene moiety; and wherein said polymeric material (A) has a melt viscosity of at least 0.50 kNsm$^{-2}$.

Said assembly or apparatus may be subjected to a temperature of less than −75° C. or less than −100° C. or less than −120° C. or less than −140° C. in use. Advantageously, the component may have suitable properties at even lower temperatures. Thus, said assembly or apparatus may be subjected to a temperature of less than −150° C. or even less than −165° C.

Said component may be subjected to a temperature of less than −50° C. in use. Said component may be subjected to a temperature of less than −75° C. or less than −100° C. or less than −120° C. or less than −140° C. in use. Said component may be subjected to a temperature of less than −150° C. or even less than −165° C.

Said assembly may be positioned in a very low temperature environment (or in an environment which may reach a very low temperature), for example in an environment wherein the temperature is at less than −75° C., less than −100° C., less than −120° C., less than −150° C. or even less than −165° C. Said assembly may be in a polar region or underground. Said assembly may be an oil and/or gas installation. Said assembly may be associated with liquid natural gas (LNG), for example LNG handling, transport or storage devices. Said assembly may be a LNG storage tank and/or a part associated therewith. Said component may be part of the storage tank and/or a part associated therewith.

Said component may be selected from the group comprising a seal, a valve, a part of a valve, a gasket, a bearing, a part of a bearing, a housing, a ring, a pipe, a part of a pipe, a pipe liner, a connector, insulation, for example for wire or cable, and a bush.

Apparatus for use in relation to said assembly may comprise apparatus which is temporarily or intermittently used in relation to said assembly. For example, such apparatus may be introduced into (or used with) an oil or gas installation in order to carry out a task on or in relation to the oil or gas installation.

In a preferred embodiment, at least 95%, preferably at least 99%, of the number of phenylene moieties (Ph) in polymeric material (A) have 1,4-linkages to moieties to which they are bonded. It is especially preferred that each phenylene moiety in polymeric material (A) has 1,4-linkages to moieties to which it is bonded.

Preferably, the phenylene moieties in repeat unit of formula I are unsubstituted.

Said polymeric material (A) may include at least 68 mol %, preferably at least 71 mol %, of repeat units of formula I.

Said repeat unit of formula I suitably has the structure

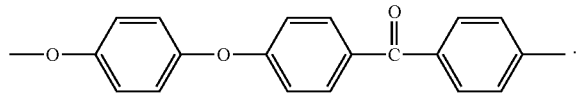

II

In a first preferred embodiment, said polymeric material (A) includes at least 80 mol %, preferably at least 90 mol %, more preferably at least 95 mol %, especially at least 99 mol % of repeat units of formula I, especially those of formula II. Thus, in this embodiment, said polymeric material (A) is preferably a homopolymer, which is preferably polyetheretherketone (PEEK).

In a second embodiment, said polymeric material (A) may have a repeat unit of formula I as described and a repeat unit of formula —O-Ph-Ph-O-Ph-CO-Ph    III wherein Ph represents a phenylene moiety.

A preferred repeat unit of formula III has the structure

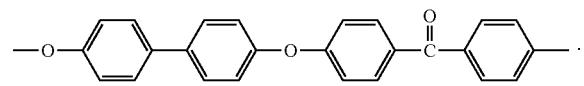

IV

In said second embodiment, said polymeric material (A) may include at least 68 mol %, preferably at least 71 mol %, of repeat units of formula II. Particular advantageous polymers may include at least 72 mol %, or, especially, at least 74 mol % of repeat units of formula II. Said polymeric material (A) may include less than 90 mol %, suitably 82 mol % or less of repeat units of formula II. Said polymeric material (A) may include 68 to 82 mol %, preferably 70 to 80 mol %, more preferably 72 to 77 mol % of repeat units of formula II.

In said second embodiment, said polymeric material (A) may include at least 10 mol %, preferably at least 18 mol %, of repeat units of formula IV. Said polymeric material (A) may include less than 32 mol %, preferably less than 29 mol % of repeat units of formula IV. A particularly advantageous polymeric material (A) of the second embodiment may include 28 mol % or less; or 26 mol % or less of repeat units of formula IV. Said polymeric material (A) may include 18 to 32 mol %, preferably 20 to 30 mol %, more preferably 23 to 28 mol % of units of formula IV.

The sum of the mol % of units of formula II and IV in said polymeric material (A) of the second embodiment is suitably at least 95 mol %, is preferably at least 98 mol %, is more preferably at least 99 mol % and, especially, is about 100 mol %.

In said second embodiment, the ratio defined as the mol % of units of formula II divided by the mol % of units of formula IV may be in the range 1.8 to 5.6, is suitably in the range 2.3 to 4 and is preferably in the range 2.6 to 3.3.

Melt viscosity (MV) of said polymeric material (A) may be assessed, unless otherwise stated herein, as described in Test 1 hereinafter.

Said polymeric material (A) suitably has a MV of at least 0.55 kNsm$^{-2}$, preferably of at least 0.60 kNsm$^{-2}$, more preferably at least 0.62 kNsm$^{-2}$. The MV may be less than 1.0 kNsm$^{-2}$. Preferably, MV is in the range 0.55 to 0.75 kNsm$^{-2}$, for example in the range 0.60 to 0.70 kNsm$^{-2}$.

Said component may include at least 40 wt %, suitably at least 50 wt %, preferably at least 80 wt %, more preferably at least 95 wt %, especially at least 98 wt % of said polymeric material (A). Said component preferably consists essentially of said polymeric material (A).

Said component which includes said polymeric material (A) may include at least 1 g, at least 5 g, at least 100 g or at least 500 g of said polymeric material (A).

The invention of the first aspect preferably relates to an assembly as described (in preference to a said apparatus as described).

Said polymeric material (A) may be manufactured by aromatic nucleophilic substitution, wherein said aromatic nucleophilic substitution comprises reacting a nucleophile with a 4,4'-difluorobenzophenone monomer, and wherein said 4,4'-difluorobenzophenone monomer has a purity of at least 99.7% w/w by difference, preferably at least 99.8% w/w by difference, more preferably at least 99.85% w/w by difference, even more preferably at least 99.9% w/w by difference as measured using HPLC-UV analysis as set out in Test 3 herein.

According to a second aspect of the invention, there is provided a method of providing a component in a position (A) in which it is subjected to a temperature of less than −50° C., said method comprising:

(i) selecting a component, an assembly comprising said component or an apparatus comprising said component, wherein said component comprises a polymeric material (A) having a repeat unit of formula —O-Ph-O-Ph-CO-Ph-    (I)

wherein Ph represents a phenyl moiety; and wherein said polymeric material (A) has a melt viscosity of at least 0.50 kNsm$^{-2}$, and (ii) moving said component, assembly or apparatus to position (A).

Position (A) may be such that the component is subjected to a temperature of less than −75° C., less than −100° C., less than −120° C., less than −150° C. or even less than −165° C.

The temperature at position (A) may be less than −50° C., less than −75° C., less than −100° C., less than −120° C., less than −150° C. or even less than −165° C.

Said position (A) may be in or adjacent a region which contains natural gas, for example liquid natural gas (LNG). Said position (A) may be in a polar region.

Said component, said assembly, said apparatus and said polymeric material (A) may be as described according to the first aspect.

According to a third aspect of the invention, there is provided the use of a polymeric material (A) for making a component for use in an environment in which the temperature is less than −50° C. or in which the temperature may fall to less than −50° C., for example during the presence in said environment of said component, wherein said polymeric material (A) has a repeat unit of formula —O-Ph-O-Ph-CO-Ph-    (I)

wherein Ph represents a phenylene moiety; and wherein said polymeric material (A) has a melt viscosity of at least 0.50 kNsm$^{-2}$.

The temperature in the environment may be less than −75° C., less than −100° C., less than −120° C., less than −140° C., less than −150° C. or even less than −165° C.

Said polymeric material (A) may be as described in the first aspect.

Said environment may be as described for position (A) in the second aspect. Said environment may be in or adjacent a region which contains natural gas, for example LNG; or said environment may be in a polar region.

According to a fourth aspect of the invention, there is provided a method of making a component for an assembly or apparatus as described in the first aspect, the method comprising:

(i) selecting a polymeric material (A) as described herein;
(ii) melt processing the polymeric material (A);
(iii) forming said component during and/or after step (ii).

Step (ii) may comprise extrusion or injection moulding.

The component, assembly, apparatus and polymeric material (A) may be as described in any aspect described herein.

The invention extends to a liquid natural gas (LNG) assembly which comprises a component as described in any preceding aspect, for example the first aspect.

An LNG assembly may be associated with LNG handling, transport or storage. Said assembly may be a LNG storage tank and/or a part associated therewith. Said component may be a part of an LNG storage tank and/or a part associated herewith.

Any feature of any aspect of any invention or embodiment described herein may be combined with any feature of any other invention described herein mutatis mutandis.

Specific embodiments of the invention will now be described, by way of example, with reference to the accompanying figures, in which:

FIG. 1 is a plot of log MFI v. Melt Viscosity for a series of polymers.

FIGS. 2 to 6 provide respective results of tensile strength, tensile modulus, tensile elongation, flexural strength and un-notched Charpy Impact of two different PEEK polymers at two different temperatures;

FIG. 7 provides results for tensile elongation for two different PEEK polymers and PTFE at two different temperatures;

Figure 1:
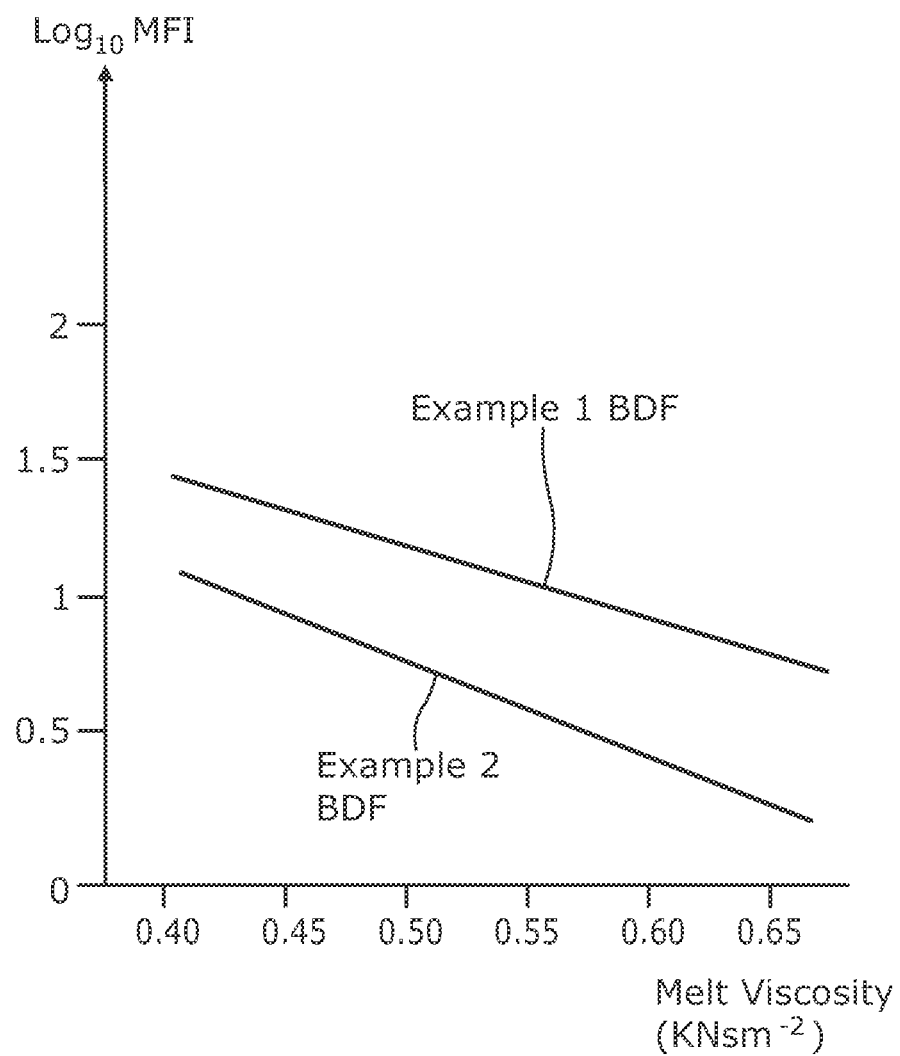
Figure 2:
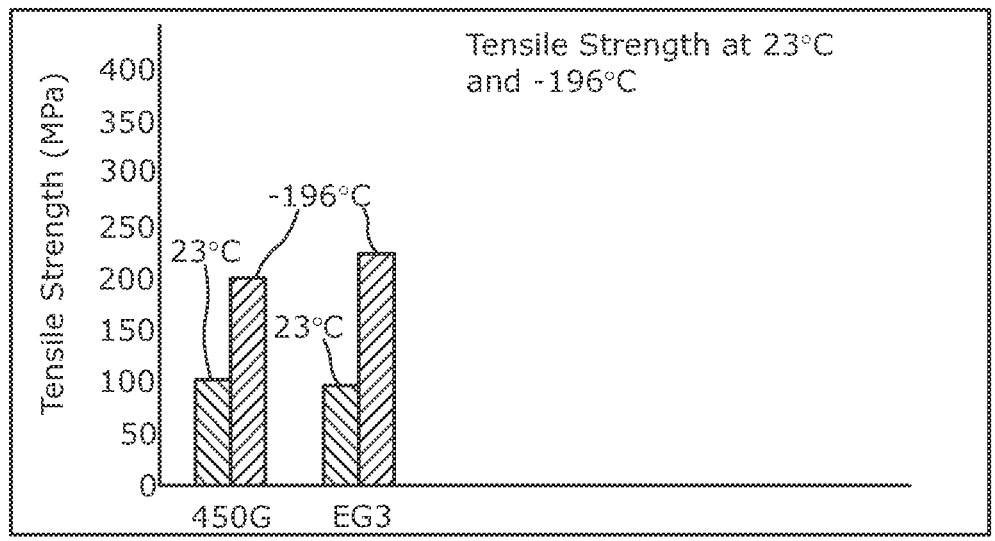
Figure 3:
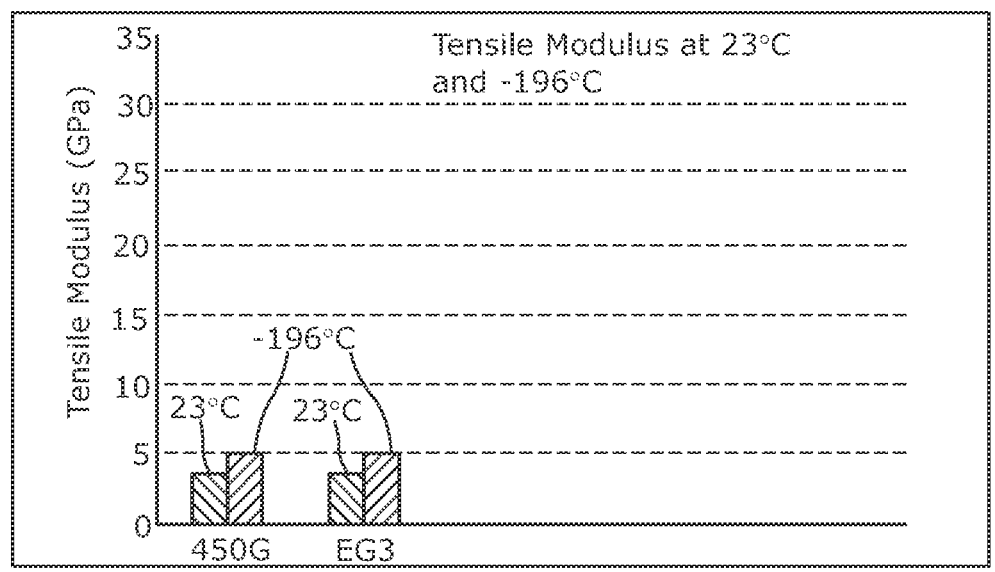
Figure 4:
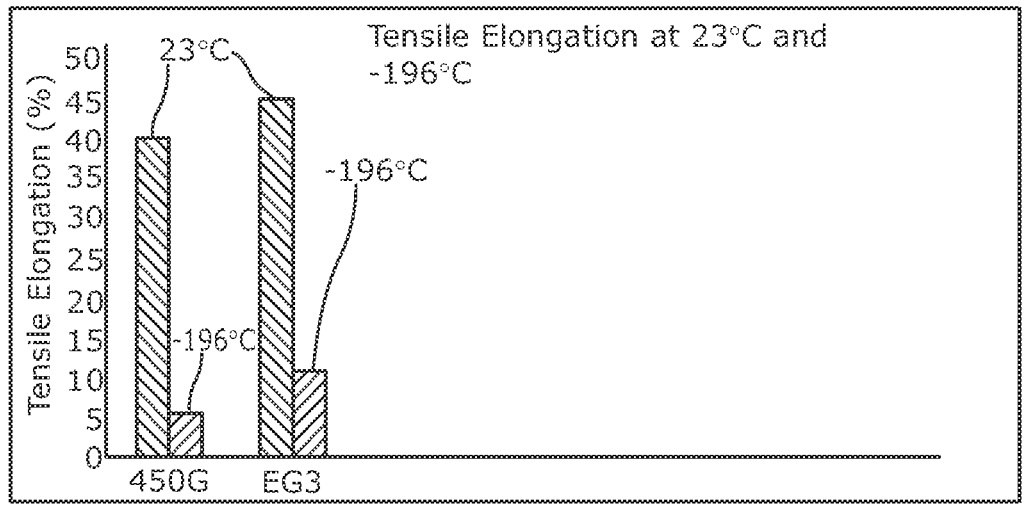
Figure 5:
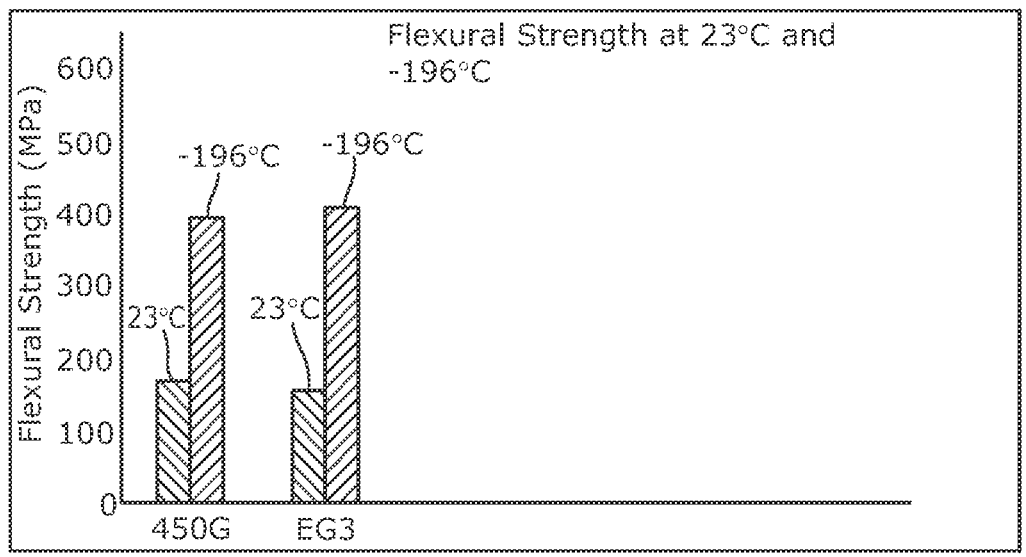
Figure 6:
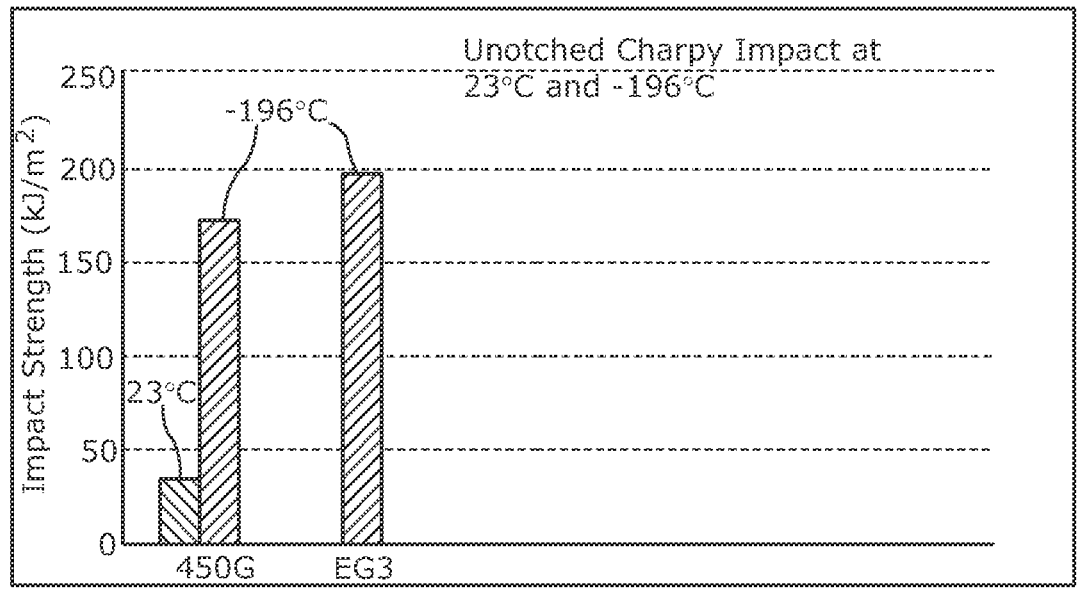

The following materials are referred to hereinafter:

PEEK 450G—PEEK polymer in granule form commercially available from Victrex Plc, Thornton Cleveleys, UK. The polymer has an MV of 0.45 kNsm$^{-2}$ when measured as described in Test 1.

PTFE—Teflon® PTFE in mechanical grade sheet form commercially available from Professional Plastics, Inc.

PCTFE—Kel-F® PCTFE in sheet form commercially available from Professional Plastics, Inc.

The following tests are used in the examples which follow.

Test 1—Melt Viscosity of Polyaryletherketones

Melt Viscosity of polyaryletherketones was measured using a ram extruder fitted with a tungsten carbide die, 0.5 mm (capillary diameter)×3.175 mm (capillary length). Approximately 5 grams of the polyaryletherketone was dried in an air circulating oven for 3 hours at 150° C. The extruder was allowed to equilibrate to 400° C. The dried polymer was loaded into the heated barrel of the extruder, a brass tip (12 mm long×9.92±0.01 mm diameter) placed on top of the polymer followed by the piston and the screw was manually turned until the proof ring of the pressure gauge just engages the piston to help remove any trapped air. The column of polymer was allowed to heat and melt over a period of at least 5 minutes. After the preheat stage the screw was set in motion so that the melted polymer was extruded through the die to form a thin fibre at a shear rate of 1000 s$^{-1}$, while recording the pressure (P) required to extrude the polymer. The Melt Viscosity is given by the formula $$\text{Melt Viscosity} = \frac{P\pi r^4}{8\,LSA} kNsm^{-2}$$

where
P=Pressure/kN m$^{-2}$
L=Length of die/m
S=ram speed/m s$^{-1}$
A=barrel cross-sectional area/m$^2$
r=Die radius/m The relationship between shear rate and the other parameters is given by the equation:

$$\text{Apparent wall shear rate} = 1000\,s^{-1} = \frac{4Q}{\pi r^3}$$

where Q=volumetric flow rate/m$^3$ s$^{-1}$=SA.

Test 2—Melt Flow Index of Polyaryletherketones

The Melt Flow Index of the polyaryltherketone was measured on a CEAST Melt Flow Tester 6941.000. The dry polymer was placed in the barrel of the Melt Flow Tester apparatus and heated to 380° C., this temperature being selected to fully melt the polymer. The polymer was then extruded under a constant shear stress by inserting a weighted piston (5 kg) into the barrel and extruding through a tungsten carbide die, 2.095 mmbore×8.000 mm. The MFI (Melt Flow Index) is the mass of polymer (in g) extruded in 10 minutes.

Test 3—HPLC-UV Analysis of 4,4'-Difluorobenzophenone

The HPLC method is carried out on an Agilent 1220 Infinity LC system. The analysis conditions were:

Mobile Phase:
A—Laboratory Supply Deionised Water
B—LC grade Methanol
Gradient:

| Time (min) | B (%) | Flow (mL/min) |
|---|---|---|
| 0 | 55 | 0.5 |
| 28 | 55 | 0.5 |
| 50 | 80 | 0.5 |
| 52 | 55 | 0.5 |
| 60 | 55 | 0.5 |

Column:
Thermo Hypurity C18 (or equivalent)
250×4.6 mm (22103–254630)
Guard cartridge, C18 10×4.0 mm (22103–014001)
Column Temperature: 50° C.
Injection Volume: 20 uL
UV detector: 255 nm and 293 nm, spectra collection enabled The sample was prepared by dissolving 100 mg+/−10 mg of DFBP in 10 ml of methanol. 100 μL of this solution was transferred to an LC vial containing 900 μL 60:40 methanol/water.

The amounts of monofluorobenzopheone (MFB), 2,4'-difluorobenzophoene (2,4' BDF), 4,4'-difluorobenzophenone (4,4' BDF), 4-fluoro-4'-chlorobenzopenone and 4-fluoro-4'-nitrobenzophenone were determined using a calibration with external standards of different concentrations to generate a calibration curve.

Calibrated Peak Table:

| Component | Detection Wavelength (nm) | Retention Time (min) | Typical r$^2$ linear (typical calibration) |
|---|---|---|---|
| 2,4'-difluorobenzophenone | 255 | 29.0 | 0.9999 |
| Monofluorobenzopheone | 255 | 30.6 | 0.9999 |
| 4,4'-difluorobenzophenone | 255 | 34.0 | 0.9999 |
| 4-fluoro-4'-chlorobenzopenone | 255 | 47.7 | 0.9999 |
| 4-fluoro-4'-nitrobenzophenone | 255 | 53.3 | 0.9999 |

Results are expressed as % w/w of the impurities.
The purity is quoted (see infra) as a % w/w of 4,4'-BDF by difference.

Test 4—Melting Point Range Determination

The melting point range is determined automatically by optical transmission measurement using a Büchi B-545. The first value is recorded at 1 percent transmission.

Settings:
  gradient: 1° C./min
  Set point: 101° C.
  mode: Pharmacopoe
  detection: 1 and 90 percent The melting point range is recorded as the difference between 90 and 1 percent of melting point determination.

Test 5—Colour Measurements

Colour measurements were carried out on injection moulded ISO test bars of selected PEEK polymers prepared as described herein. Standard type 1A ISO test bars (ISO 3167) were injection moulded using on a Haitian injection moulding machine with a barrel temperature of 320° C.-335° C., nozzle temperature of 335° C. and a tool temperature of 160° C.

The measurements were made using a Konica Minolta Chromameter with a DP400 data processor operating over a spectral range of 360 nm to 750 nm. A white plate calibration was carried out with a D65 (natural daylight) light source. Colour measurements are expressed at L*, a* and b* coordinates as defined by the CIE 1976 (Nassau, K. Kirk-Othmer Encyclopaedia of Chemical Technology, chapter 7, page 303-341, 2004). Values were determined from a single point on the ISO test bar.

Test 6—Measurement of Tc by DSC

The crystallisation temperature from the melt (Tc) for selected PEEK polymers prepared as described herein was determined by Differential Scanning calorimetry.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned as follows:

Step 1 Perform a preliminary thermal cycle by heating the sample from 30° C. to 400° C. at 20° C./min.

Step 2 Hold for 2 mins.

Step 3 Cool at 20° C./min to 30° C. and hold for 5 mins.

Step 4 Heat from 30° C. to 400° C. at 20° C./mins.

From the resulting scan the Tc was the temperature at which the main peak of the crystallisation from the melt reached a maximum.

In the following description, 4,4-difluorobenzophenone (BDF) used to prepare polyetheretherketone (PEEK) for use in low temperature applications is described in Example 1. For comparison, BDF made by a different method is described in Example 2. Procedures for making PEEK are described in Examples 3 and 4. PEEK polymers prepared are tested using the tests described above, and results reported and discussed.

EXAMPLE 1—PREPARATION OF 4,4'-DIFLUOROBENZOPHENONE (BDF) BY REACTING FLUOROBENZENE AND 4-FLUOROBENZOYLCHLORIDE

A 10 liter 3-necked round-bottomed flask fitted with a mechanical stirrer, a thermometer, a dropping funnel containing 4-fluorobenzoyl chloride (1550 g, 9.78 moles) and a reflux condenser was charged with fluorobenzene (2048 g, 21.33 moles) and anhydrous aluminium trichloride (1460 g, 10.94 moles). The mixture was maintained at 20 to 30° C. with stirring and the 4-fluorobenzoylchloride was added dropwise over a period of 1 hour. When the addition was complete the temperature of the reaction mixture was increased to 80° C. over a period of 2 hours, allowed to cool to ambient temperature then carefully discharged into ice(4 kg)/water(2 kg). The mixture was recharged to a 20 l 1-necked round-bottomed flask fitted with distill head. The contents were heated to distill off the excess fluorobenzene until a still-head temperature of 100° C. was reached. The mixture was cooled to 20° C. and the crude 4,4'-difluorobenzophenone was filtered off, washed with water and dried at 70° C. under vacuum.

The crude product was recrystallised as follows: Dry crude product (100 g) was dissolved with stirring in hot industrial methylated spirits (400 cm$^3$) and charcoal, filtered, water (100 cm$^3$) was added, reheated to reflux to dissolve the product and then cooled. The product was filtered off, washed with 1:1 industrial methylated spirits/water then dried at 70° C. under vacuum. The product had a melting point range of 107-108° C. determined using Test 4 and a 4,4'-difluorobenzophenone purity of greater than 99.90% determined using Test 3. Details on the purity are provided below for three replicates of Example 1 (referred to as Examples 1 a, 1b and 1c).

| Example | 2,4'BDF (% w/w) | MFB (% w/w) | 4F,4'Cl (% w/w) | 4,4'DCBP (% w/w) | 4,4' FNBP (% w/w) | 4,4'BDF (% w/w by difference) |
|---|---|---|---|---|---|---|
| Example 1a | 0.005 | 0.027 | N/D | N/D | N/A | 99.97 |
| Example 1b | 0.004 | 0.026 | <0.001 | <0.001 | N/A | 99.97 |
| Example 1c | 0.003 | 0.019 | 0.002 | N/D | N/A | 99.98 |

EXAMPLE 2 (COMPARATIVE)—PREPARATION OF 4,4'-DIFLUOROBENZOPHENONE (BDF) BY THE NITRIC ACID OXIDATION OF 4,4'-DIFLUORODIPHENYLMETHANE

The process described in Example 2 of EP 4710 A2 for the oxidation of 4,4'-difluorodiphenylmethane was followed except the scale was increased by a factor of 3.

Following the recrystallisation procedure described in Example 2 of EP 4710 A2, 4,4'-determined (115 g) with a melting point range 106-107° C. and a purity of about 99.6%, determined using Test 3. Details on the purity are provided below for two replicates of Example 2 (referred to as Examples 2a and 2b).

| Example | 2,4'BDF (% w/w) | MFB (% w/w) | 4F,4'Cl (% w/w) | 4,4'DCBP (% w/w) | 4,4' FNBP (% w/w) | 4,4'BDF (% w/w by difference) |
|---|---|---|---|---|---|---|
| Example 2a | N/A | 0.32 | N/A | N/A | 0.06 | 99.62 |
| Example 2b | N/A | 0.38 | N/A | N/A | 0.05 | 99.57 |

EXAMPLE 3—PREPARATION OF POLYETHERETHERKETONE

A 3 L vessel fitted with a ground glass Quickfit lid, stirrer/stirrer guide, nitrogen inlet and outlet was charged with 4,4'-difluorobenzophenone from Example 1 (269.76 g, 1.236 mole), hydroquinone (133.2 g, 1.2 mole) and diphenylsulphone (600 g) and purged with nitrogen for over 1 hour. The contents were then heated to between 140 and 150° C. to form an almost colourless solution. Dried sodium carbonate (127.32 g, 1.2 mole) and potassium carbonate (3.336 g, 0.0242 mole) were added. The temperature was raised to 200° C. and held for 1 hour; raised to 250° C. and held for 1 hour; raised to 315° C. and maintained for 2 hours or until the required melt viscosity was reached, as determined by the torque rise of the stirrer. The required torque rise was determined from a calibration graph of torque rise versus MV. The reaction mixture was then poured into a foil tray, allowed to cool, milled and washed with 2 liters of acetone and then with warm water at a temperature of 40-50° C. until the conductivity of the waste water was <2 µS. The resulting polymer powder was dried in an air oven for 12 hours at 120° C. The MV of the resulting polymer was 0.65 kNsm$^{-2}$ measured according to Test 1.

EXAMPLES 4—PREPARATION OF SAMPLES OF POLYETHERETHERKETONE FROM DIFFERENT SOURCES OF 4,4'-DIFLUOROBENZOPHENONE (BDF) AND AT A RANGE OF MELT VISCOSITIES

The procedure described in Example 3 was repeated except the source of 4,4'-difluorobenzophenone was varied as between that described in Example 1 and in Example 2 and the polymerisation time was varied to produce polyetheretherketone with a range of melt viscosities. The Melt Viscosity and Melt Flow Index of a range of products were assessed and a relationship between Melt Viscosity and Melt Flow Index determined.

It was found that the following relationship applied to PEEK of different melt viscosities prepared from the BDF described in Example 1:

Log$_{10}$ MFI=2.34−2.4×Melt Viscosity

It was found that the following relationship applied to PEEK of different melt viscosities prepared from the BDF described in Example 2:

Log$_{10}$MFI=2.235−3.22×Melt Viscosity where MFI and melt viscosity were determined as described in Tests 1 and 2.

For illustrative purposes, the equations referred to are represented in FIG. 1 for MV from about 0.40 to 0.70 kNsm$^{-2}$.

It should be appreciated from FIG. 1 that the MFI of the PEEK prepared from Example 1 monomer is significantly higher than for the PEEK prepared from Example 2 monomer. In addition, as described hereinafter, other properties of PEEK prepared from the Example 1 monomer are advantageous and make such PEEK polymer highly suited for use in very low temperature applications.

Results from Tests 5 and 6 for colour and Tc for PEEK polymers made from the BDF of Examples 1 and 2 are provided in the tables below from which it is clear that there are significant differences between the two types of polymers.

| BDF from Example | PEEK Colour | | |
|---|---|---|---|
| | L* | a* | b* |
| 1a | 60.94 | 1.84 | 9.86 |
| 1b | 60.76 | 1.82 | 9.35 |
| 1c | 61.89 | 1.80 | 7.86 |
| 2a | 58.94 | 2.16 | 7.42 |
| 2b | 58.22 | 2.25 | 7.98 |

| BDF from Example | PEEK Tc (° C.) |
|---|---|
| 1a | 283.3 |
| 1b | 283.5 |
| 1c | 282.7 |
| 2a | 289.9 |
| 2b | 289.3 |

PEEK 450G (comparative) and PEEK prepared as described in Example 3 using the BDF described in Example 1 and having a Melt Viscosity assessed as described in Example Test 1 of 0.65 kNsm$^{-2}$ (herein referred to as PEEK EG3) were tested for their suitability for use in low temperature applications as discussed further below.

Details on the tests undertaken are described below. In general, tests were undertaken at ambient temperature (23° C.) and at very low temperature (77K; −196° C.) using liquid nitrogen.

Bending Tests

These were carried out according to ISO 178 in liquid nitrogen. In the case of large deformations, the strains and stresses were corrected according to ISO-14125.

Tensile Tests

Tensile tests according to ISO 527 were carried out using a special test fixture (INCONEL 718) suitable for liquid nitrogen temperatures.

Impact Tests

Charpy Impact tests were made on un-notched samples according to ISO 179-1: 2010 using a Dynatup 9250HV drop tower.

Results for tensile strength, tensile modulus, tensile elongation, flexural strength and un-notched Charpy Impact for PEEK 450G and PEEK EG3 at 23° C. and −196° C. are provided in FIGS. 2 to 6. It will be noted that PEEK EG3 generally has significantly superior properties over PEEK 450G at −196° C.

Figure 7:
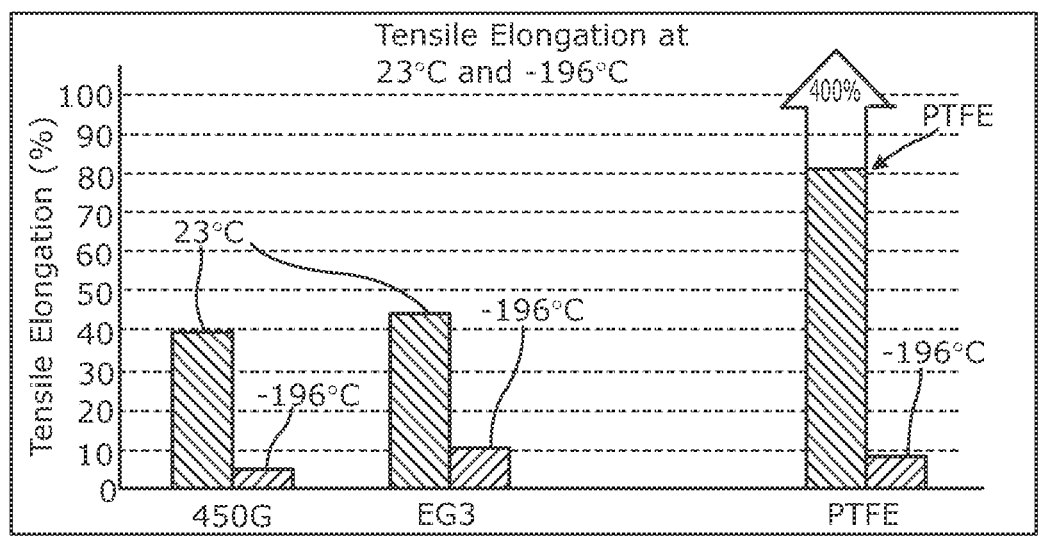

FIG. 7 provides a comparison of tensile elongation for PEEK 450G, PEEK EG3 and commercially available PTFE.

It will be noted that PEEK EG3 has superior low temperature properties compared to the other polymers.

To assess the ductility of PEEK 450G and PEEK EG3 at −196° C., stress-strain curves for the two polymers were constructed at the aforementioned temperature. The curves for PEEK 450G and PEEK EG3 are provided in FIGS. 8 and 9 respectively.

Figure 8:
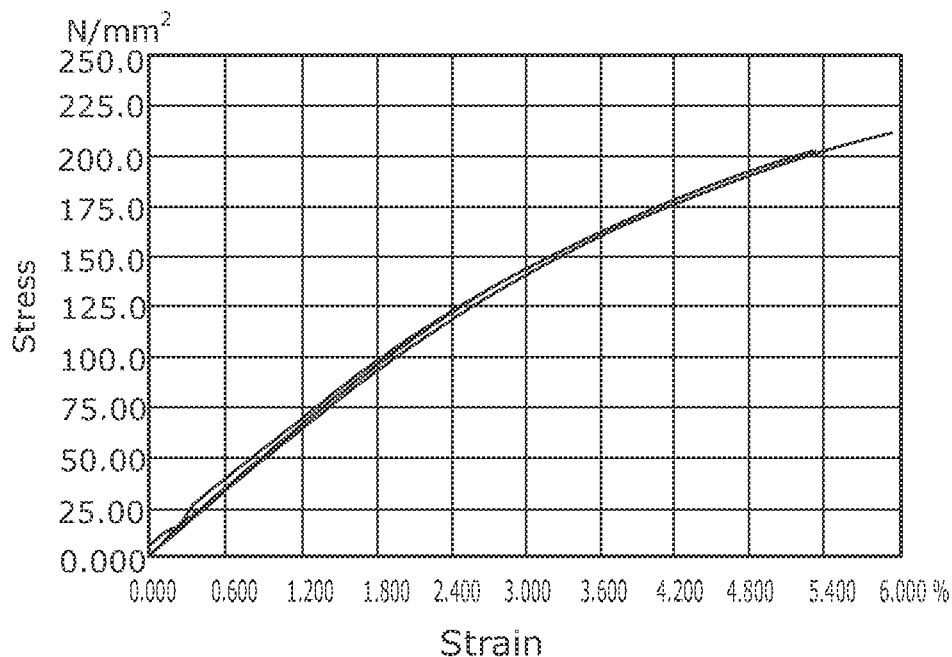
FIG. 8 is a plot of stress v. strain for PEEK 450G at −196° C.
Figure 9:
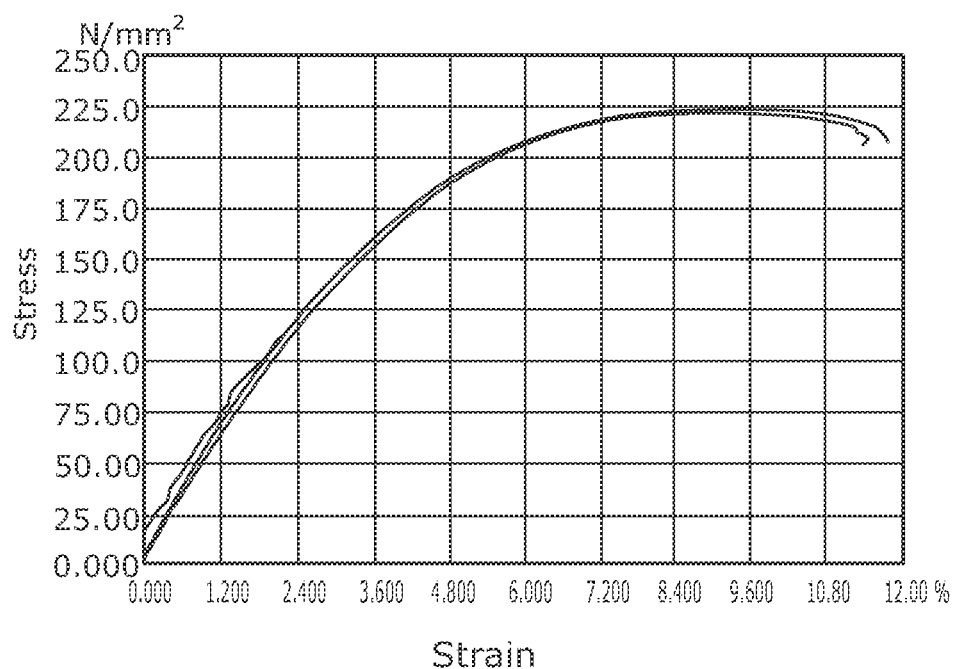
FIG. 9 is a plot of stress v. strain for a polymer referred to herein as PEEK EG3 at −196° C.

Comparing FIGS. 8 and 9, it should be noted that 450G material does not significantly yield at −196° C. and fails at relatively low strains (about 6%); whereas FIG. 9 shows significant yielding at higher strains before the specimen failure—that is, it shows ductility up to about 11% strain.

The fracture surfaces of tensile bars used in constructing the curves of FIGS. 8 and 9 were examined. For the PEEK 450G bars assessed, there was little evidence of yielding since the fracture surfaces were found to be fairly smooth. There is some evidence of cleavage stop which are structures which indicate the direction of crack propagation and which cause the crack to divide into several fracture paths which recombine as the fracture progresses. In contrast, for the PEEK EG3 bars, there is clear evidence of ductility. In ductile thermoplastic failures, the load causes macromolecules to stretch and, as a fracture progresses, the elongated stretched areas (as they break) recoil showing peaks which have stretched and which are sometimes slightly thicker at their ends.

The strain at break for PEEK EG3 is even higher than reported for PTFE or PCTFE which are currently widely used commercially for seals which are to be subjected to very low temperatures. Furthermore, the PEEK EG3 polymer is found to have higher tensile and flexural strengths compared to the fluoropolymer materials meaning that usage loads (e.g. sealing forces) may be higher for the PEEK EG3 polymer. Additionally, the PEEK EG3 polymer enjoys excellent chemical resistance properties and, generally, has been shown to have improved wear and erosion resistance compared to fluoropolymers.

The samples tested to generate the results shown in FIGS. 2-9 were prepared via direct injection moulding rather than machining from solid stock shapes of polymer.

Further Testing

Two further batches of PEEK EG3 polymer were prepared following example 3 above. Injection moulded samples were prepared from these two batches and tested alongside injection moulded PTFE, PCTFE and PEEK 450G samples in a number of bending, tensile, compressive and impact tests at −196° C. A further batch of PEEK EG3 polymer was prepared (following example 3 above) and formed into solid stock shapes (plates) which were machined/milled to provide samples. These "Machined" PEEK EG3 samples were tested in the same bending, tensile, compressive and impact tests at −196° C.

Machined samples were prepared and tested in order to evaluate if machining/milling has any detrimental effect on mechanical properties. Very low temperature sealing applications commonly use seals that have been precision machined from solid stock shapes of polymer (e.g. PCTFE and PTFE seals). Detrimental effects are often seen in material testing, where machined samples can exhibit lower strength and elongation at break because of micro-cracks left behind by the machining process. The Machined PEEK EG3 samples therefore more closely mimic the properties which one might expect from an article which had been machined rather than moulded.

The bending tensile, and impact tests were carried out as detailed above and the compressive tests were carried out according to ISO 604. Results for flexural strength, flexural modulus, tensile strength, tensile modulus, tensile elongation, compressive strength, compressive modulus and un-notched Charpy impact strength of PTFE, PCTFE, PEEK 450G, PEEK EG3 and Machined PEEK EG3 samples at −196° C. are shown in the tables below:

| Sample | Flexural Strength (MPa) | Flexural Modulus (GPa) | Tensile Strength (MPa) | Tensile Modulus (GPa) | Tensile Elongation (%) |
|---|---|---|---|---|---|
| PTFE | 183.70 | 6.431 | 90.21 | 5.720 | 3.28 |
| PCTFE | 265.93 | 5.697 | 128.03 | 5.064 | 3.31 |
| PEEK 450G | 417.45 | 5.818 | 194.69 | 5.346 | 5.10 |
| PEEK EG3 | 434.43 | 5.475 | 221.75 | 5.184 | 9.28 |
| Machined PEEK EG3 | 432.93 | 5.735 | 221.77 | 5.492 | 8.41 |

| Sample | Compressive Strength (MPa) | Compressive Modulus (GPa) | Charpy Impact Strength (kJm$^{-2}$) |
|---|---|---|---|
| PTFE | 204.40 | 6.229 | 62.88 |
| PCTFE | 319.50 | 5.013 | 45.96 |
| PEEK 450G | 322.49 | 5.078 | 172.82 |
| PEEK EG3 | 320.76 | 4.882 | 193.74 |
| Machined PEEK EG3 | 313.16 | 5.050 | 209.64 |

Tables of Mechanical Test Results for PTFE, PCTFE, PEEK 450G, PEEK EG3 and Machined PEEK EG3 Samples at −196° C.

Repeat tests were conducted for each type of test (i.e. Flexural Strength, Flexural Modulus etc.). The values in the above tables are averaged values calculated, for each type of test, from: five tests for PTFE; five tests for PCTFE; five tests for each of two batches for PEEK 450G except for the compressive strength and compressive modulus tests which were averaged from five tests for one batch only; five tests for each of two batches for PEEK EG3 except for the compressive strength and compressive modulus tests which were averaged from five tests for one batch only; and nine tests for Machined PEEK EG3 except for the tensile strength, tensile modulus and tensile elongation tests which were averaged from five tests, and the compressive modulus test which was averaged from six tests.

The results show that both the PEEK EG3 and Machined PEEK EG3 samples exhibit higher flexural and tensile strength compared to samples of the incumbent materials. This indicates that components used in accordance with the present invention possess a higher loading potential and therefore a greater safety margin with regard to breakage.

The PEEK EG3 and Machined PEEK EG3 samples also exhibit higher un-notched Charpy impact strength than the comparative samples. This indicates a tougher product offering higher resilience and consequently a higher factor of safety.

The PEEK EG3 and Machined PEEK EG3 samples exhibit equivalent compressive strength to the PCTFE and PEEK 450G samples, and far greater compressive strength than the PTFE samples.

The flexural, tensile and compressive modulus values of the PEEK EG3 samples are lower than for any of the other samples except for the PCTFE tensile modulus value. Lower values indicate that the PEEK EG3 samples are more flexible at low temperature, and therefore require lower loads to deform i.e. a lower force would be required to form a seal.

Additionally, the tensile elongation values that the PEEK EG3 and Machined PEEK EG3 samples exhibit are far higher than those for the comparative samples. This indicates that components used in accordance with the present invention have significantly higher ductility and hence would provide more robust performance at low temperature.

It is also worth noting that the Machined PEEK EG3 samples provide equivalent results to the PEEK EG3 (i.e. injection moulded) samples in all of the tests, indicating that machining/milling at most has a minor effect on mechanical properties.

Ring Compression Test

This test is designed to simulate the compression of a seal by a steel ball in a real application, e.g. this is what occurs during the operation of a quarter turn ball valve. In such a valve the ball has a hole through its centre. When in the open position, fluid can flow through the centre of the ball. When the handle is turned a quarter turn the hole in the ball is no longer accessible and the flow ceases. In such a valve, the ball is held in place by a valve seat which has a seal. In the test a 50 mm diameter valve seat was machined to mate with a steel bearing. A ring shaped seal for the valve seat was prepared from each of PTFE, PCTFE, PEEK 450G and PEEK EG3. To test the seal in question the seal was fitted into the valve seat and the bearing was slowly compressed into the seal. The load displacement response of the seal was evaluated at 7 kN compressive load and the residual displacement on removal of the load was measured to assess recovery. The tests were conducted at −196° C. The results are shown in the below table in which the values are averages calculated from five samples for each material for each test:

| Sample | Maximum Displacement at 7 kN Compressive Load (mm) | Residual Displacement on Removal of Load (mm) |
| --- | --- | --- |
| PTFE | 0.71 | 0.33 |
| PCTFE | 0.51 | 0.14 |
| PEEK 450G | 0.48 | 0.12 |
| PEEK EG3 | 0.52 | 0.14 |

Table of Ring Compression Test Results for PTFE, PCTFE, PEEK 450G and PEEK EG3 samples at −196° C.

The results demonstrate that the PEEK EG3 ring retains its shape at −196° C. in a similar way to the PCTFE and PEEK 450G materials. Furthermore, when the load is removed, the PEEK EG3 material recovers its original form much more quickly than PTFE and similarly to PCTFE and PEEK 450G (residual displacement on removal of load). It is a desirable property for the sealing materials to spring back quickly (especially at very low temperatures) as it ensures that the material is always ready to remake a new seal. It is notable that PTFE does not spring back quickly, having more than twice the residual displacement of PEEK EG3 and PCTFE. These results illustrate that components used in accordance with the present invention have good low temperature sealing properties.

The PEEK EG3 polymeric material may have wide ranging uses. For example, it may be used for parts or components which may be subjected to low temperatures in use, for example at or below cryogenic temperatures. The polymer may be used for parts or components associated with LNG storage tanks. The polymer may be used for parts or components which are to be used in polar regions, for example in or associated with oil and/or gas installations. Examples of uses of the PEEK EG3 polymer include:

seals, in general e.g. valve seals, valve stem seals, butterfly valve seals, spring energised seals; seals of a seal stack, seal backup rings;

valves or parts thereof—e.g. ball valve seats, check valve seats, valve plates such as compression valve plates, valve spindles, rotary valves, valve actuators such as a solenoid valve;

gaskets;

bearings—e.g. thrust bearings;

housings—e.g. for sensors;

rings—e.g. piston, packing, throttle or wiper rings;

pipes—e.g. for aerospace or oil and gas applications or other conduits for fluid transport;

pipe liners;

connectors;

wire and cable jacketing/insulation;

bushings.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An assembly or apparatus for use in relation to an assembly, wherein said assembly is subjected to a temperature of less than −100° C. in use, wherein said assembly or apparatus includes a component which comprises a polymeric material (A) having a repeat unit of formula

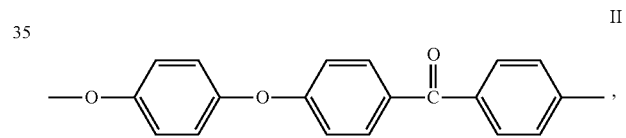

II wherein said polymeric material (A) includes at least 80 mol % of repeat units of formula II; and wherein said polymeric material (A) has a melt viscosity of at least 0.50 kNsm$^{-2}$.

2. An assembly or apparatus according to claim 1, wherein said assembly or apparatus and/or wherein said component is subjected to a temperature of less than −140° C. in use.

3. An assembly or apparatus according to claim 1, wherein said assembly is associated with liquid natural gas handling, transport or storage.

4. An assembly or apparatus according to claim 1, wherein said assembly is a liquid natural gas storage tank or a part associated therewith, or wherein said component is a part of a liquid natural gas storage tank or a part associated therewith.

5. An assembly or apparatus according to claim 1, wherein said component is selected from the group consisting of a seal, a valve, a part of a valve, a gasket, a bearing, a part of a bearing, a housing, a ring, a pipe, a part of a pipe, a pipe liner, a connector, insulation, and a bush.

6. An assembly or apparatus according to claim 1, wherein said polymeric material (A) has a melt viscosity of at least 0.60 kNsm$^{-2}$.

7. An assembly or apparatus according to claim 1, wherein said polymeric material (A) has a melt viscosity in a range 0.55 to 0.75 kNsm$^{-2}$.

8. An assembly or apparatus according to claim 1, wherein said component includes at least 95 wt % of said polymeric material (A).

9. An assembly or apparatus according to claim 1, wherein said polymeric material (A) is manufactured by aromatic nucleophilic substitution, wherein said aromatic nucleophilic substitution comprises reacting a nucleophile with a 4,4'-difluorobenzophenone monomer, and wherein said 4,4'-difluorobenzophenone monomer has a purity of at least 99.7% w/w by difference, as measured using HPLC-UV analysis.

10. A method of making a component for an assembly or apparatus as described in claim 1, the method comprising: (i) selecting the polymeric material (A); (ii) melt processing the polymeric material (A); (iii) forming said component during and/or after step (ii).

11. A method according to claim 10, wherein step (ii) comprises extrusion or injection moulding.

12. A liquid natural gas assembly which comprises a component as described in claim 1.

13. An assembly according to claim 12, said assembly being associated with liquid natural gas handling, transport or storage.

14. An assembly according to claim 13, wherein said assembly is a liquid natural gas storage tank and/or a part associated therewith.

* * * * *